Jan. 6, 1970  R. H. BUCKLEY  3,487,863
INDEXING OF ROTARY MEMBERS OF MACHINES
Filed Feb. 27, 1968  3 Sheets-Sheet 1

INVENTOR.
ROBERT HOWARD BUCKLEY
BY Kenwood Ross
ATTORNEY.

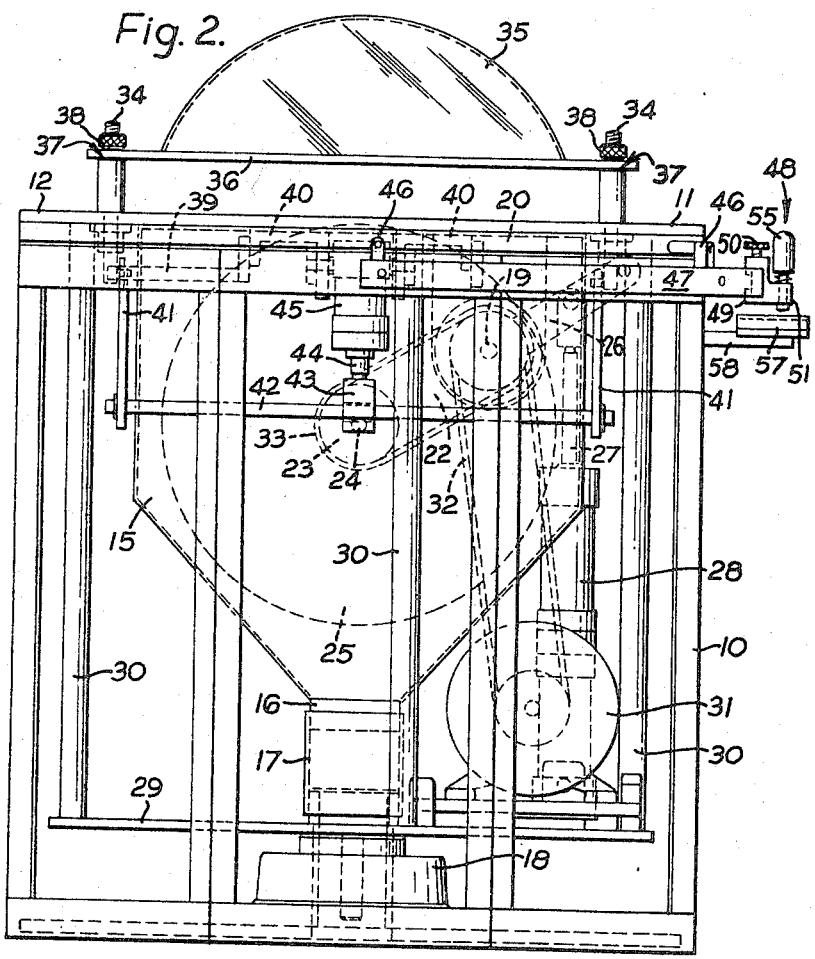
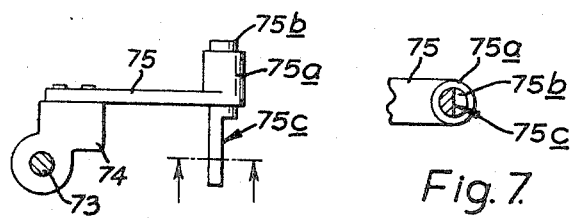

Jan. 6, 1970    R. H. BUCKLEY    3,487,863
INDEXING OF ROTARY MEMBERS OF MACHINES
Filed Feb. 27, 1968    3 Sheets-Sheet 3

INVENTOR.
ROBERT HOWARD BUCKLEY
BY *Kenwood Ross*
ATTORNEY.

United States Patent Office 3,487,863
Patented Jan. 6, 1970

3,487,863
INDEXING OF ROTARY MEMBERS OF MACHINES
Robert Howard Buckley, Rochdale, England, assignor to Thomas Robinson & Son Limited, Rochdale, Lancashire, England
Filed Feb. 27, 1968, Ser. No. 713,267
Claims priority, application Great Britain, Mar. 9, 1967, 11,025/67
Int. Cl. B27d 27/08
U.S. Cl. 143—36                    6 Claims

ABSTRACT OF THE DISCLOSURE

A machine, such as a sawing, drilling, milling or like machine, having a component rotatable about a vertical axis, characterized by an actuator which controls the machine, and indexing means comprising an arcuate member extending around the rotatable component and coaxial therewith, and having a plurality of adjustable stops thereon each said stop being adapted, when in register with the actuator, to operate the latter to cause actuation of the machine, the actuator and the arcuate member being connected to or provided one on the rotatable component and the other on a stationary part of the machine.

---

The invention concerns the indexing of rotary members on machines, such as sawing, drilling, milling and like machines.

In the sawing, for example, of timber roof truss components, not only is repetition work involved, but it is often, and almost invariably, necessary for successive cuts on the same component and cuts on successive components to be at different angles. Thus, a machine which will simply facilitate successive cuts to be made at one and the same angle relative to a workpiece fence, for repetition sawing, is of very little value in speeding up the cutting of such components.

An object of this invention is to provide, on a machine such as a saw, drill, milling machine or the like, an arrangement which facilitates the indexing of a component of the machine to predetermined angularly spaced positions, and which, when employed on a sawing machine enables the same workpiece or successive workpieces to be cut at different predetermined angles in a particularly simple and convenient manner.

With this object in view the present invention provides a machine, such as a sawing, drilling, milling or like machine, having a component rotatable about a vertical axis, characterised by an actuator which controls the machine, and indexing means comprising an arcuate member extending around the rotatable component and coaxial therewith, and having a plurality of adjustable stops therein each such stop being adapted, when in register with the actuator, to operate the latter to cause actuation of the machine, the actuator and the arcuate member being connected to or provided one on the rotatable component and the other on a stationary part of the machine.

In a preferred application of the invention as applied to a sawing machine, the rotary component is a rotatable table through which a circular saw blade is adapted to project, the arcuate member being carried by the table.

In the latter instance, the actuator preferably serves to control a guard of the machine to lower such guard towards the table, then to raise the saw to project through the table to effect a cutting operation, and to lower the saw, and then to raise the guard.

The machine preferably includes a fence for location of a workpiece thereagainst and one or more end stops for abutment of a workpiece end thereagainst, each said stop being pivotable about a vertical axis so as to conform to the angle of the end of the workpiece presented thereto.

In order that the invention may be fully understood, it will be described further, by way of example, with reference to the accompanying drawings, in which:

FIG. 2 is a side elevation of the machine of FIG. 1, but with the conveyors and sidewall omitted;

FIG. 6 is a detached detail of the stop arm arrangement of the apparatus of FIG. 1; and FIG. 7 is an underneath plan corresponding to the line VII—VII of FIG. 6.

Figure 3:
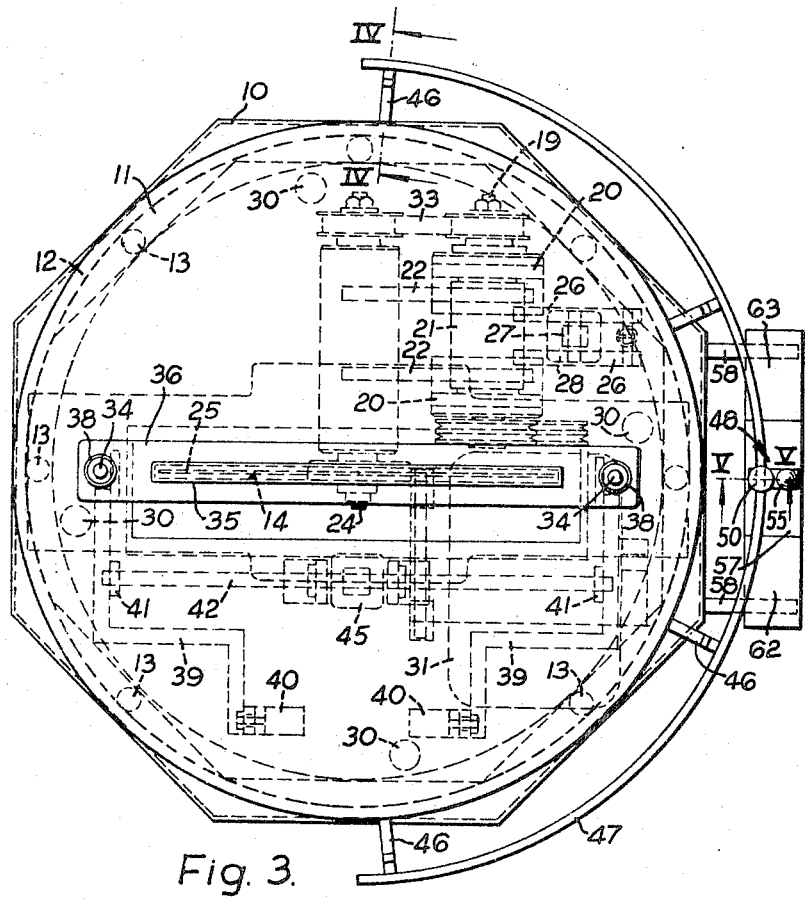
FIG. 3 is a plan view of the machine.
Figure 4:
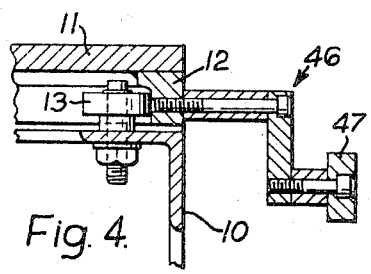
FIG. 4 is an enlarged section taken on the line IV—IV of FIG. 3.

In the drawings, a sawing machine constructed in accordance with the invention comprises a basic housing 10 supporting, at an appropriate working height, a circular rotatable table 11. This table 11 has a depending peripheral flange 12 (FIG. 3) engaged by rollers 13 carried by the housing 10, and has a substantially diametrically disposed slot 14 therethrough, this slot 14 forming the entry of a saw casing 15 (see FIG. 2) which is made of sheet material and is disposed beneath the table 11. This casing 15 tapers at its bottom end to a spigot 16 which is coaxial with the axis of rotation of the table 11, and extends through a bearing 18 supported by the basic housing 10 near the bottom thereof. The spigot 16 projects into a gland 17 providing a lateral connection (not shown) with a suction pipe (not shown).

Beneath the underside of the table 11 is a saw supporting framework, this being rotatable with the table 11 and comprising an intermediate shaft 19 journalled in brackets 20 secured to the underside of the table 11 and having a sleeve-like saw arm trunnion 21 mounted thereon, between the brackets 20, by appropriate bearings (not visible in the drawings). A main saw arm in the form of two spaced-apart parallel plates 22 projects from the trunnion 21 and carries, at its outer end an elongate sleeve bearing 23 in which a main saw shaft 24 is journalled. The main shaft 24 projects through an arcuate slot (not visible) in the saw casing 15 and has a saw blade 25 mounted thereon within the casing 15. A trunnion arm extension in the form of two parallel members 26 extends away from the trunnion 21 at the side thereof remote from the main saw arm 22, and this extension 26 has pivotally connected thereto a piston rod 27 of a main hydraulic or pneumatic ram 28 operation of which serves to swing the arm 22 between an operative position wherein the saw blade 25 projects upwards through the slot 14 in the top of the table 11 and an inoperative position wherein such blade is withdrawn below the table 11. The lower end of the ram 28 is mounted upon a platform 29 rotatably mounted within the housing 10 beneath the table 11 by the bearing 18 and supporting the table 11 from below by pillars 30 projecting upwards from the platform 29. This platform 29 also has mounted thereon a drive motor 31 for the saw blade 25, drive being transmitted by belts 32 to the intermediate shaft 19 and belt 33 to the main shaft 24.

The saw blade 25 is set such that the outer edges of the teeth thereof at the side remote from the swingable arm 22 are in a vertical plane through the axis of rotation of the table 11, and the vertical diameter of a circle through such outer edges of the teeth is coincident with the axis of rotation of the table 11.

Projecting upwards through the table 11, one adjacent each end of the slot 14, are a pair of vertically displaceable rods 34, these serving to locate above the slots 14, an inverted-trough-like saw guard 35 by a flange 36 of such guard 35 fitting over the rods 34 and resting upon the upper ends of shoulders 37 formed on the rods 34. Nuts 38 provided on the upper screwed ends of the rods 34 hold the flange 35 down against the shoulders 37. Beneath the table 11, each of the rods 34 is pivotally connected to one end of a respective cranked arm 39 the other end of which is pivotally connected to a respective bracket 40 secured to the underside of the table 11. Each such arm 39 has a respective downwardly projecting link 41, which links 41 are coupled by a coupling bar 42 extending transversely beneath the table 11 and connected by a lug 43 to piston rod 44 of a guard-controlling hydraulic or pneumatic ram 45 for raising and lowering the guard 35.

Figure 5:
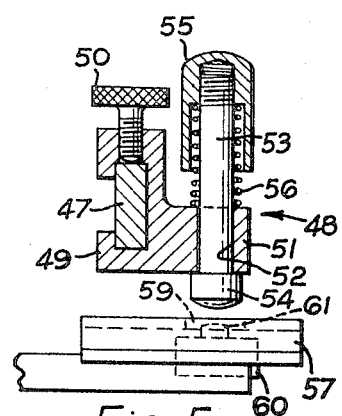
FIG. 5 is an enlarged section taken on the line V—V of FIG. 3.

Radially-disposed Z-shaped brackets 46 connect with the table 11 at angularly-spaced intervals around the periphery thereof, and these serve to connect, to the table 11, an arcuate indexing bar 47 which is approximately a semi-circle in extent. The indexing bar 47 is generally rectangular in radial cross-section and is marked-off at intervals, for example, of one degree. Adjustably disposed on the indexing bar are a plurality of indexing stops 48 of which one only is illustrated. Each such stop 48 comprises a C-shaped slide member 49 fitting on and slidable along the indexing bar 47 to any desired position, a manually-rotatable thumb screw 50 enabling the slide member 49 to be locked in position. Projecting laterally from the slide member 49 so as to extend radially outwardly of the machine is a lug 51 having a vertical aperture 52 (FIG. 5) therethrough, this aperture 52 accommodating a plunger 53 comprising a shank having an enlarged head 54 at its lower end and a knob 55 screwed onto its upper end. The plunger 53 is surrounded by a spring 56 which abuts by its lower end against the lug 51 and by its upper end against the knob 55 and which thereby biases the plunger 53 upwards. When the plunger 53 is depressed against the action of its spring 56, the head 54 projects at the underside of the lug 51.

Figure 1:
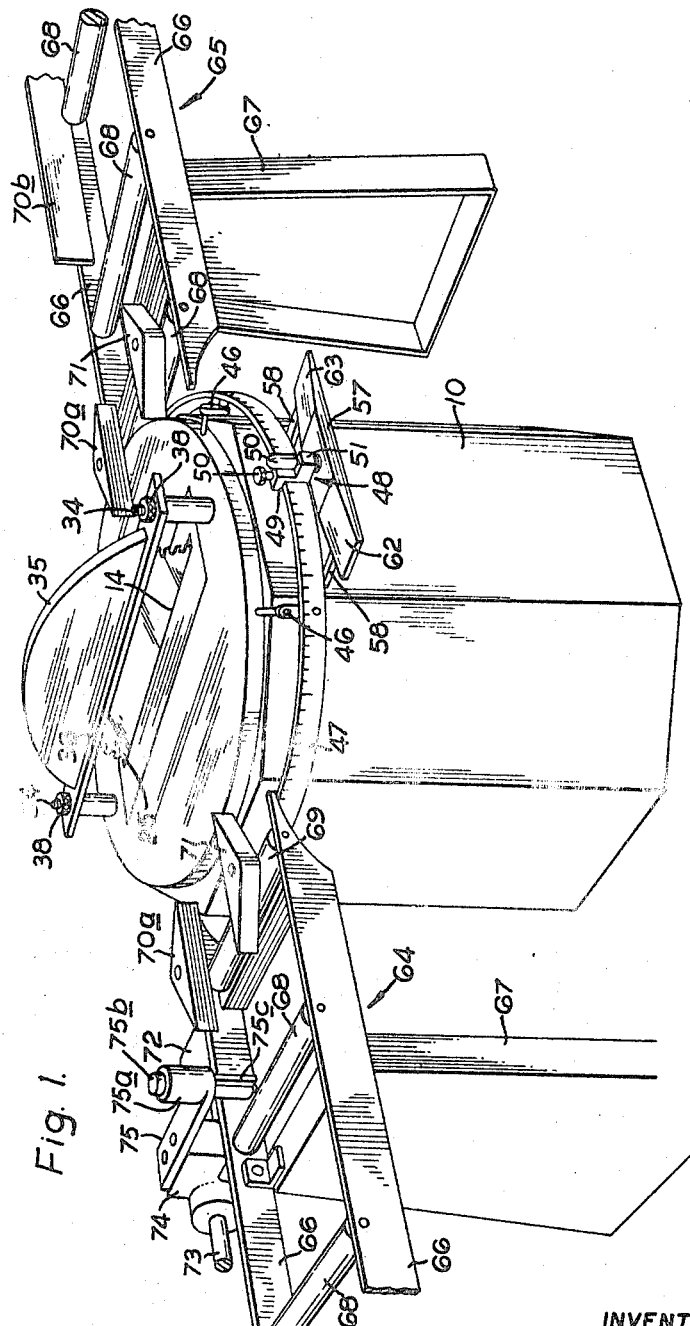
FIG. 1 is a perspective view of a sawing machine, with its respective conveyors, constructed in conformity with the present invention.

At a datum position of the machine, a narrow platform 57 is supported, by two bearers 58 (FIG. 1) projecting from the main housing 10, so as to extend approximately tangentially of the table 11 but at a spacing therefrom. This platform 57 has an opening 59 (FIG. 5), therein approximately at its midpoint, and an actuator switch 60 secured to the underside of the platform 57 has an operating button 61 which is disposed within the opening 59 so as to be protected from accidental depression whilst being capable of being depressed by a member, such as the head 54 of one of the indexing plungers 53, pressed downwards into the opening 59 in the platform 57. The lateral ends of the platform 57 are inclined as at 62, 63 to constitute ramps as will later appear.

Mounted to each side of the machine are respective substantially horizontal roller conveyors 64, 65 each comprising respective parallel rail pairs 66 supported on bearers 67 and having transverse rotatable rollers 68 extending therebetween. The upper surfaces of the rollers 68 are substantially coplanar with the upper surface of the table 11. Adjustably arranged above the conveyors 64 and 65 are back fence members 70a and 70b, these being adjustable parallel towards and away from an imaginary line extending along the conveyors 64 and 65 and through the axis of rotation of the table 11. Means (not illustrated) permitting such adjustment may provide for individual adjustment of the fence members or simultaneous gauged adjustment theerof, e.g. by way of a single hand wheel. The fence members 70a and 70b may, also, be adjustable towards and away from the saw, that is to say in the longitudinal direction of the conveyors 64, 65. Aligned with the fence members 70a and facing the latter from the opposite side of the conveyors 64, 65 are clamps 71 adapted to be moved by respective pneumatic rams (not visible) towards the respective members 70a for clamping workpieces in position for cutting, the clamping means being adapted to be controlled, for example, by a foot pedal (not shown).

Secured to one of the rails 66 of the conveyor 64 is a bracket 72 from which a rod 73 extends parallel to the rails 66. A boss 74 clampable on the rod 73 has a lateral stop arm 75 projecting therefrom so as to extend across the conveyor 64. The arm 75 has a vertically disposed bearing sleeve 75a at its free end, such sleeve 75a rotatably accommodating a vertical stop bar 75b the lower part of which is machined off to semi-circular form to provide a planar stop face 75c the vertical centre line of which is coincident with the axis of rotation of the stop bar 75b and is parallel with the axis of rotation of the table 11. Adjustment of the boss 74 along the rod 73 permits adjustment of the linear distance between the stop face 75c and the axis of rotation of the table 11. The rod 73 is adapted for rotation in the bracket 72 to swing the stop arm 75 between its operative position overhanging the conveyor 64 as illustrated and an inoperative position raised up clear of the conveyor 64. The machine may, if desired, be provided with a plurality of the stop arm arrangements just discussed, and an oil/pneumatic ram or other suitable means (not shown) may be provided for swinging these arms between their operative and inoperative positions as discussed.

Operation of the machine is as follows: Assuming that the machine is to be employed for sawing, for example, roof truss components all of the same width, but having angled ends, with the angles on some of the components different from those on others of the components, the guide members 70 are set up so that their perpendicular distances from the centre of rotation of the table 11 equal one half of the width of the timber to be cut. Thus, the vertical diameter of the saw blade 25 will always coincide with the longitudinal centre line of the timber regardless of the angle at which the timber is being cut.

Selected ones of the stop arms 75 are then set up at appropriate locations at distances from the centre of rotation of the table 11 corresponding to the desired sawn lengths of the workpieces, measured along the centre lines of such workpieces. A workpiece to be cut is now introduced onto the table 11 beneath the guard 35, by way of the conveyor 65, until a small length at the leading end of the workpiece has passed the slot 14. The workpiece is now clamped by the clamps 71 and the table 11 is rotated to bring the saw blade 25 to the desired angular orientation relative to the workpiece by grasping a preset one of the indexing stops 48 corresponding to such angle and using it as a handle for rotating the table 11. At the same time, the plunger 53 of the grasped stop 48 is pressed down by means of the knob 55 so that the head 54 thereof protrudes at the underside of its lug 51. Accordingly, as the selected indexing stop 48 approaches the datum position it runs up the corresponding one of the inclined ramps 62 or 63 of the platform 57 and then runs on the top surface of the platform until it registers with the opening 59 in the platform 57.

The operator's hand pressure on the plunger 53 causes the latter to move down again, so that the head 54 engages with and actuates the push button 61 of the actuaor switch 60. This puts in operation a control circuit (not illustrated) of the two rams 28 and 45 firstly to cause the guard 35 to be lowered to clamp the workpiece onto the table 11, secondly then to raise the saw blade 25 through the slot 14 in the table 11 to produce a first cut at the leading end of the workpiece, then to lower the saw blade 25, and finally to release and raise the guard 35. The workpiece is now travelled along the table 11 until its leading edge contacts the stop face 75c of a selected one of the stop arms 75 and abuts tightly against such stop face 75c, rotation of the stop bar 75b in the bearing sleeve 75a enabling the stop face 75c to assume an orientation corresponding to the angle of the leading edge of the workpiece, and cutting is then effected at the trailing end of the workpiece. If the angle of cut required at the trailing end is the same as at the leading end, then the cutting is effected without any intervening rotation of the table 11 simply by depressing the plunger 53 and thereby initiating the series of operations above discussed. If, however, the cut at the trailing end is desired to be at a different angle to that at the leading end then a second one of the indexing stops 48 will be provided on the indexing bar 47 at an appropriately adjusted position, and such second indexing stop will be used as a handle to rotate the table 11 until its plunger is brought into register with the opening 59 in the platform 57, the cutting operations as above discussed being initiated by the plunger's head, of the second indexing stop, depressing the push button 61.

After both ends of the workpiece have been cut, it is removed, together with the resultant off-cuts and a fresh workpiece put in its place, whereupon the above operations of rotating the table (if necessary) and pressing the plunger of the respective indexing stop into engagement with the button of the actuator switch are repeated.

There are considerable advantages in providing for the vertical diameter of the saw to be on the centre line of the workpiece and for the stop face 75c of the stop bar 75b to contain the swivelling axis of the bar 75b and also to be on the centre line of the workpiece, in relation to measurement of the desired finished workpiece length along the centre line, since the stop provided by the bar 75b will take up any necessary orientation as may be necessary according to the shape of the end of the workpiece, simply by reaction of the workpiece end thereagainst, to provide for accurate linear dimensioning without having to rely upon accurate setting up to the extreme ends (which may be damaged in the case of very sharply tapered truss components) of the workpiece, where variations may occur. Furthermore, in truss component calculations, dimensions can readily be calculated along the centre lines of the components so that the saw can very readily reproduce theoretically-calculated components without the need to resort to precise overall length computations. It is, of course, possible to provide for the stop bar 75b to be locked with its face at any desired angular orientation.

Still further, several finished lengths of truss members can be produced from one initial length of timber by the proper adjustment of and choice of the indexing plungers and length stops.

The invention is not confined to the precise details of the foregoing example and variations may be made thereto if desired. Thus, whilst we have described an arrangement wherein the indexing stops are provided on the rotary table of the machine and the complementary actuator is stationary, the reverse arrangement wherein the stops are stationary and the actuator moves with the table is possible.

In the described embodiment the fence members 70a and 70b may be gauged together for simultaneous movement and, accordingly, for adjustment in unison with one another, and if desired supplementary fences (not shown) may be provided above the table 11 close to the saw, such supplementary fences being adapted to move upon rotation of the table and saw, to accommodate such rotation.

The invention can, of course, be applied to any machine having a component desired to be indexed by rotation about a vertical axis to selected ones of a plurality of predetermined positions, and is not limited to sawing machines as described.

What is claimed is:

1. A machine, such as a sawing, drilling, milling or like machine, having a component rotatable about a vertical axis, characterised by an actuator which controls the machine, and indexing means comprising an arcuate member extending around the rotatable component and coaxial therewith, and having a plurality of adjustable stops thereon each said stop being adapted, when in register with the actuator, to operate the latter to cause actuation of the machine, the actuator and the arcuate member being connected to or provided one on the rotatable component and the other on a stationary part of the machine.

2. A machine as claimed in claim 1, wherein the rotary component is a rotatable table through which a circular saw blade is adapted to project, the arcuate member being carried by the table.

3. A machine as claimed in claim 2 wherein the actuator serves to control a guard of the machine to lower such guard towards the table, then to raise the saw to project through the table to effect a cutting operation, and to lower the saw, and then to raise the guard.

4. A machine as claimed in claim 1 wherein each stop comprises a spring-loaded plunger adapted for manual depression and the actuator is provided in alignment with an aperture in a platform or the like whereby depression of the plunger to engage the actuator can be effected only when the plunger is in register with the aperture.

5. A machine as claimed in claim 4 wherein ramp surfaces are provided at each side of the platform, so as to raise the plunger, against manual depression thereof, as the plunger approaches registration with the aperture.

6. A machine as claimed in claim 1 including a fence for location of a workpiece thereagainst and one or more end stops for abutment of a workpiece end thereagainst each said stop being pivotable about a vertical axis so as to conform to the angle of the end of the workpiece presented thereto.

References Cited

UNITED STATES PATENTS 2,937,672   5/1960   Gjerde _____ 143—36 X

ANDREW R. JUHASZ, Primary Examiner

Z. R. BILINSKY, Assistant Examiner

U.S. Cl. X.R.

83—581; 143—6